United States Patent
Donovan, Jr. et al.

(10) Patent No.: US 9,832,401 B1
(45) Date of Patent: Nov. 28, 2017

(54) MINIMIZATION OF FIXED PATTERN NOISE IN IMAGES OF MOVING SCENES

(71) Applicant: Northrop Grumman Systems Corporation, Falls Church, VA (US)

(72) Inventors: John C. Donovan, Jr., Norwalk, CA (US); Mikio L. Yujiri, Redondo Beach, CA (US); Hiroshi Agravante, Long Beach, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 0 days.

(21) Appl. No.: 15/271,341

(22) Filed: Sep. 21, 2016

(51) Int. Cl.
| | |
|---|---|
| *H04N 5/365* | (2011.01) |
| *H04N 5/77* | (2006.01) |
| *H04N 5/232* | (2006.01) |
| *H04N 7/18* | (2006.01) |

(52) U.S. Cl.
CPC ....... *H04N 5/3651* (2013.01); *H04N 5/23254* (2013.01); *H04N 5/23293* (2013.01); *H04N 5/772* (2013.01); *H04N 7/185* (2013.01)

(58) Field of Classification Search
None
See application file for complete search history.

(56) References Cited

U.S. PATENT DOCUMENTS

| | | | | |
|---|---|---|---|---|
| 7,474,334 B1* | 1/2009 | Patterson | ............ | G06K 9/0063 |
| | | | | 348/207.99 |
| 2004/0051797 A1* | 3/2004 | Kelly | ............ | H04N 5/361 |
| | | | | 348/244 |
| 2008/0247462 A1* | 10/2008 | Demos | ............ | H04N 19/597 |
| | | | | 375/240.03 |
| 2009/0046177 A1* | 2/2009 | Lee | ............ | H04N 5/3658 |
| | | | | 348/241 |
| 2015/0003575 A1* | 1/2015 | Mallinson | ............ | H03H 17/0286 |
| | | | | 375/371 |
| 2015/0310594 A1* | 10/2015 | Olsson | ............ | G06T 5/50 |
| | | | | 382/263 |
| 2016/0132052 A1* | 5/2016 | Seydoux | ............ | G05D 1/0022 |
| | | | | 701/2 |
| 2016/0203613 A1* | 7/2016 | Paxton | ............ | G06T 7/20 |
| | | | | 348/148 |
| 2016/0330414 A1* | 11/2016 | Takado | ............ | H04N 9/045 |
| 2017/0094909 A1* | 4/2017 | Bhavani | ............ | A01D 46/24 |

* cited by examiner

*Primary Examiner* — James Hannett
(74) *Attorney, Agent, or Firm* — Patti & Malvone Law Group, LLC

(57) ABSTRACT

An exemplary method implements fixed pattern noise compensation for captured visual images of a moving scene. A current X-by-Y frame of image values captured by a camera is stored in memory where the magnitude of each image value represents a light level associated with a respective X-by-Y position in the frame. A moving average value for each image value over a number of X-by-Y frames is determined where the moving average value for each X-by-Y image value represents a level of fixed pattern noise for the moving scene. X-by-Y frames with fixed pattern noise compensated image values are generated based on subtracting from each image value of the current X-by-Y frame the corresponding moving average value.

16 Claims, 2 Drawing Sheets

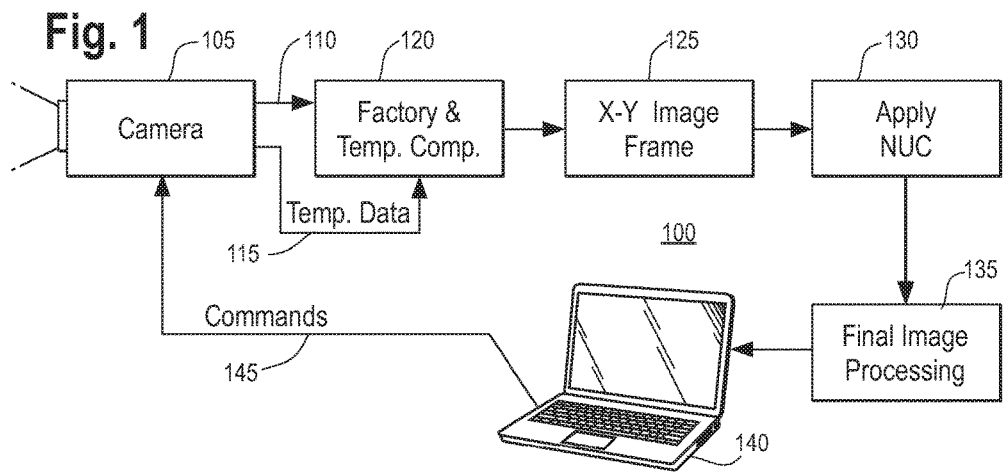
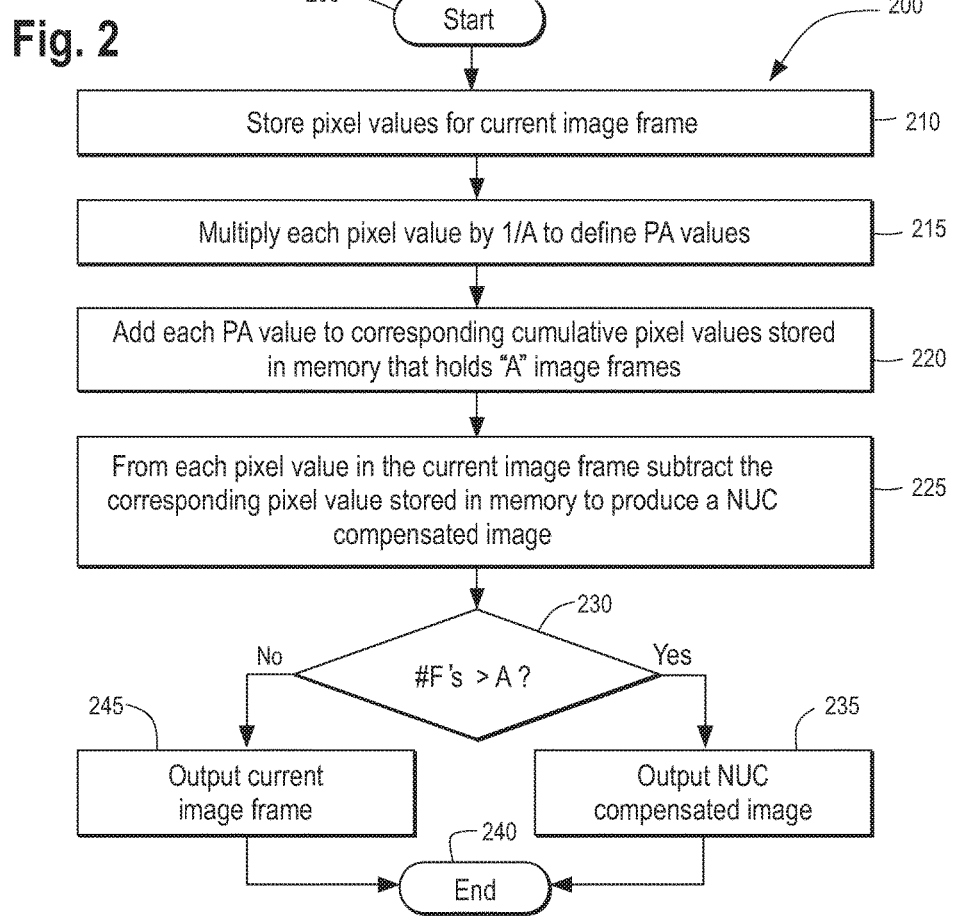

MINIMIZATION OF FIXED PATTERN NOISE IN IMAGES OF MOVING SCENES

BACKGROUND

This invention relates to images captured by an array of pixel sensors and more specifically relates to the correction of visual artifacts in images of a moving scene to improve image clarity.

Imaging systems are used in a wide range of military and civilian applications. Central to many modern imaging systems is a focal-plane array (FPA), which consists of an array of detectors positioned at the focal plane of a projected image. The focal plane of an optical system is a point/plane at which the image is focused. Thus, in an FPA system, an array of detectors is located at a point where the image is focused. An X-by-Y array of sensors may be used to capture one frame of an image when a shutter is opened. Alternatively, a rotating mirror may sweep an image frame across one or more columns of sensors that store multiple time-based samples that collectively form one frame of the image.

The performance of FPA systems is adversely affected by the non-uniformity in the output response of each of the detectors in the array, also known as fixed-pattern noise. This may be especially observed in imaging systems that capture far away scenes. Some of the sensor parameters responsible for this issue may be identified in advance and minimized by a fixed camera-based compensation for each sensor. However, it has not been possible to compensate for all the parameters and changing environmental effects giving rise to fixed pattern noise. Some fixed pattern noise, a form of non-uniformity of output, results in an image with a superimposed pattern, e.g. striping, that varies due to difficult to predict environmentally changing parameters. A typical camera physically inserts a uniform target to obtain empirical data that is saved and used to remove a fixed noise pattern. Hence, improvement in the correction of fixed pattern noise is desirable in order to produce images with increased clarity.

SUMMARY

It is an object of the present invention to satisfy this need.

An exemplary method implements fixed pattern noise compensation for captured visual images of a moving scene. A current X-by-Y frame of image values captured by a camera is stored in memory where the magnitude of each image value represents a light level associated with a respective X-by-Y position in the frame. A moving average value for each image value over a number of X-by-Y frames is determined where the moving average value for each X-by-Y image value represents a level of fixed pattern noise for the moving scene. X-by-Y frames with fixed pattern noise compensated image values are generated based on subtracting from each image value of the current X-by-Y frame the corresponding moving average value.

DESCRIPTION OF THE DRAWINGS

Features of exemplary implementations of the invention will become apparent from the description, the claims, and the accompanying drawings in which:

FIG. 1 shows an image capturing environment that embodies an embodiment of the present invention.

FIG. 2 is flow diagram of steps used in an exemplary method for practicing non-uniform compensation in accordance with an embodiment of the present invention.

DETAILED DESCRIPTION

Figure 3:
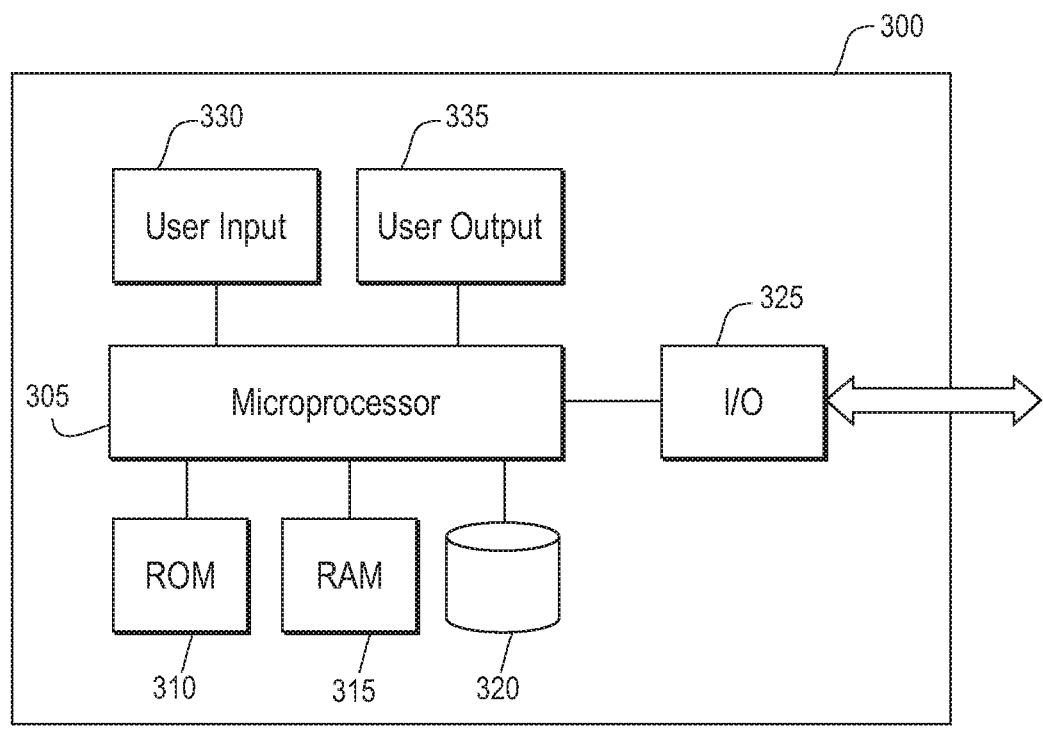
FIG. 3 is a block diagram of a computing environment suited for use in implementing the method of FIG. 2.

One aspect of the present invention resides in the recognition that in image capture environments where the scene is changing, e.g. a moving camera such as a forward-looking camera mounted in an unmanned aircraft (UAC) in flight, etc., fixed pattern noise could be minimized, if not eliminated, by processing the output from each pixel in a current image frame by subtracting from it a longer term average of corresponding pixel values, where the average pixel value represents corresponding fixed pattern noise. As used herein, a "pixel" depending on its context may refer to an individual image sensor. This process works when consecutive images/frames are of a moving scene because the desired image output of any pixel will typically vary significantly over a relatively large number of frames so that averaging the values of each pixel will cause the averaged output due to real image content to be only a small fraction of the total averaged output, thus resulting in a value representing the associated fixed pattern noise. This eliminates the use of a target and associated data capture used by conventional cameras and hence also eliminates the complexity of the mechanism to insert the target, and the interruption of the scene view during the insertion of the target.

FIG. 1 shows an image capturing environment 100 that embodies an embodiment of the present invention. The camera 105 provides a digital output 110 of pixel-based image information and an output 115 representing temperature data associated with the sensors/pixels with both outputs being received by a factory compensation and temperature compensation module 120. Although various cameras can benefit from the implementation of an embodiment of the invention, camera 105 represents a passive millimeter wave camera that captures consecutive frames of images represented by an X-by-Y pixel array. The factory compensation represents individual pixel output measurements typically made at the camera factory with corresponding stored fixed compensation applied to better normalize the output of each pixel to a common calibration value. Likewise, the temperature compensation represents individual pixel output measurements made over a temperature range typically made at the camera factory with corresponding compensation stored in a further attempt to normalize the output of each pixel over the temperature range. Although the factory compensation and temperature compensation are shown as a separate module 120, both types of compensation may be integrated within the camera itself. Each image frame output, with fixed pixel compensation having been applied as described, is received and stored at module 125 to represent an X-by-Y matrix of stored values that correspond respectively to the sensed outputs of an X-by-Y pixel array. As will be understood the physical storage of the values may not actually be in an X-by-Y form, e.g. two dimensional vectors, fixed memory locations, etc. could be used. It will be understood that the X-by-Y pixel array may represent a physical X (horizontal) by Y (vertical) arrangement of pixels at the camera or may represent the resulting output of time samples of an image projected across a column of sensors by a rotating mirror. In the latter case, the number of pixels in the column will typically correspond to Y and the number of time intervals sampled during one frame will correspond to X. Module 125 receives and stores multiple consecutive frames of images.

Module 130 applies non-uniform compensation (NUC) to each of the X-by-Y pixel values stored in module 125 in accordance with an embodiment of the present invention. The NUC is implemented on a pixel by pixel basis and is based on subtracting from each pixel in the current image frame a corresponding accumulated average value. The number of frames utilized to accumulate the average values should be based on how quickly images within the frame are moving, i.e. how quickly the scene is changing. The minimum number of frames to be utilized should be preferably selected so that primary or key objects in the scene change position within the frame or exit the field-of-view of the frame so that a substantial number of frames exist for each pixel to have seen a variety of different objects with different corresponding output values. For example, about 1000 and 500 frames may be accumulated for a forward looking camera mounted to a UAC having a field of view of 10°×10° and a frame rate of 15 frames per second while traveling at 120 knots (kts) or 240 kts, respectively. The number of frames can be experimentally determined depending on the rate of movement of the scene and the level of compensation desired for the type of scene/image being depicted. For example, the number of frames A=[camera capture rate in frames per second (fps)]*[elapsed time in seconds over which frames are to be accumulated]*[120 kts]/[air speed in kts]; 1000=15 fps*67 seconds*120 kts/120 kts. The maximum number of frames to be utilized should be preferably selected so that not too many preceding frames are required in order to begin providing NUC compensation, i.e. startup delay. Also, an object appearing in each frame for a substantial number (about "A" frames/10) frames relative to the average number may be seen as a "ghost burn in" for several frames following its actual disappearance from the field-of-view of current image frames due to the NUC compensation. This is because the pixels associated with viewing the relatively constant/stationary object will have contributed a corresponding output value for a substantial fraction of the number of frames used for the average and hence will be mistaken for and treated as fixed pattern noise for future frames. This may or may not have substantial significance depending on the particular application. For example, during observation of a runway during a landing approach by a forward looking camera on a UAC, the continued appearance of a ghost of the runway immediately after a missed approach is not of critical importance since the ghost image will have resolved itself (disappeared) prior to a second landing approach (typically more than 60 seconds later) and hence the visibility of the runway during the second approach will not be impaired due to NUC compensation.

Following the application of NUC compensation, module 135 may provide additional final image processing before consecutive frames are sent for display such as to a computer 140, e.g. computer laptop with incorporated display, desktop PC with an associated external display, etc. Module 135 may provide a variety of further image processing depending on the type of camera utilized and the camera's environment, i.e. the vehicle or apparatus on which the camera is mounted. For a camera that utilizes a vertical column(s) of pixels and a rotating mirror that horizontally scans the image across the column(s), vertical blurring of pixel values in adjacent rows of the columns may be utilized to prevent a vertical striping effect. For a forward-looking camera in a UAC seeing an upcoming runway during a final approach for landing, it may be desired to utilize vertical gradient correction in order to minimize the contrast of brightness between an upper part of the screen containing sky and the lower portion of the screen showing land and the runway. Additionally, depending upon the display on which the image frames are to be shown and the number of pixels in the X-by-Y array, it may be desirable to up-sample the number of pixels defining a frame and transfer the up-sampled image frame to the device 140 for display. A communication line 145 enables the PC 140 to transmit various commands to the camera 105.

FIG. 2 is flow diagram of steps used in an exemplary method 200 for implementing non-uniform compensation in accordance with an embodiment of the present invention. Beginning with START 205, step 210 stores the X-by-Y pixel values for the current image frame. These pixel values are preferably stored in memory in a computing system that receives the image data output from camera 105. In step 215 each of the stored pixel values representing a current image frame is multiplied by 1/A, where A corresponds to a predetermined number of consecutive frames and represents the number of frames to be utilized for the computed average. The pixel values as multiplied by 1/A defines one set of pixel average (PA) values. In step 220 each of the PA values in this set is added to a corresponding pixel average value stored in memory that holds an accumulation of A image frames. That is, in accordance with step 220 an average value for each pixel in the X-by-Y array is computed and stored over A frames. Preferably, the average values are computed for the last A number of frames and hence represents a moving average of the last A frames. Alternatively, other types of mathematical calculations can be utilized to provide an averaging function without having to store pixel values for each of the A frames. In step 225 the cumulative average pixel value for each pixel is subtracted from the corresponding current pixel value for the current image frame and the result is stored in memory representing a NUC compensated image. That is, the objective is to minimize the fixed pattern noise associated with the output of each pixel in the X-by-Y pixel array. In step 230 a determination is made of whether the number of image frames having been processed is greater than A number of frames. A YES determination by step 230, indicating that more than A frames have been processed, results in step 235 outputting the NUC compensated X-by-Y image frame. The processing terminates at END 240. A NO determination by step 230 occurs during start-up, results in an immediate burn-in of current features, and is cleared within A frames during camera motion.

In an illustrative example, a forward looking passive millimeter wave camera mounted to a UAC generates 15 frames per second, where each image frame is 35×32 pixels, and uses A=1000 for NUC compensation. This results in an NUC startup delay of 1000/15 or 67 seconds. The exemplary method has been found to provide a significant benefit for such relatively low density pixel arrays although it is beneficial for even larger pixel arrays. A minimum duration of 30 seconds at 120 kts airspeed should clear the image of a 10°×10° forward-looking array, which corresponds to about 450 frames at 120 kts per the formula in paragraph 12. The scene contrast can be as low as 1 Kelvin contrast, and the fixed pattern noise can be much higher (several Kelvin) so long as the fixed pattern noise changes slower than the time constant (a fractional Kelvin over 30-120 seconds).

FIG. 3 is a block diagram of an exemplary computer 300 suited for use in implementing the exemplary method of the present invention. The computer 300 includes a microprocessor 305, read-only memory (ROM) 310, random-access memory (RAM) 315, and nonvolatile memory storage device 320. An input/output module 325 provides an interface for communications between the microprocessor 305 and devices outside of computer 300, e.g. the camera 105, etc. Input user devices 330 include all forms of providing information to computer 300, e.g. keyboards, mouse, interactive screens, etc. Output user devices 335 include all forms of devices which may accept information from computer 300, e.g. display monitors, readouts, printers, etc.

Typically, boot software located in ROM 310 is loaded on initial activation of computer 300 followed by the loading of an operating system which may be contained in ROM 310 or nonvolatile memory 320. Higher-level application programs such as software for capturing the raw image data from the camera 105 and converting it into an X-by-Y pixel array, software for sending commands to the camera, software for implementing NUC compensation and software for controlling the output of final image information to a display may be typically loaded from the nonvolatile memory 320 into RAM 315 for execution. The functions of computer 300 may reside in the PC 140 or a separate computer may perform these functions and utilize PC 140 (or any suitable display device) primarily for display of the final images. For example, camera lines can be captured using a Camera Link frame grabber like a Pleora PT1000-CL, or a IO Industries DVR Express camera link data recorder. In a customized implementation the described functions can be part of camera-specific firmware supported by the camera computing capabilities rather than implemented later by external software.

Computer-readable signal-bearing tangible media may contain software, firmware, and/or assembly language that can perform the described functions. The computer-readable signal-bearing media in one example may contain instructions stored as magnetic, electrical, optical, biological, and atomic information. For example, the computer-readable signal-bearing media comprise magnetic discs or tapes, CD-ROMs, DVD-ROMs, hard disk drives, flash drives, and/or forms of memory storage.

Although exemplary implementations of the invention have been depicted and described in detail herein, it will be apparent to those skilled in the art that various modifications, additions, substitutions, and the like can be made without departing from the spirit of the invention. For example, NUC compensation could be applied at a different stage of the processing of the image data from the camera and could be incorporated together with other processing steps, e.g. the camera itself with sufficient computing capabilities could be used to provide a selectable output with NUC compensation. Various numbers of frames could be used for the average depending on the speed of movement of objects from frame to frame.

The scope of the invention is defined in the following claims.

The invention claimed is:

1. A method for implementing fixed pattern noise compensation for captured visual images by a camera of a moving scene comprising the steps of:
   storing a current X-by-Y frame of image values captured by the camera in memory where the magnitude of each image value represents a light level associated with a respective X-by-Y position in the frame;
   determining a moving average value for each image value over a number of X-by-Y frames where the moving average value for each X-by-Y image value represents a level of fixed pattern noise for the moving scene, where the number of X-by-Y frames used to determine the moving average values is inversely proportional to the speed at which the camera is moving;
   generating X-by-Y frames with fixed pattern noise compensation based on subtracting from each image value of the current X-by-Y frame the corresponding moving average value.

2. The method of claim 1 further comprising transmitting the X-by-Y frames with fixed pattern noise compensated image values to an electronic display device and rendering visual information on a screen of the display device based on the X-by-Y frames with fixed pattern noise compensated image values so that fixed pattern noise is minimized in the rendered visual information.

3. The method of claim 1 wherein the number of X-by-Y frames used to determine the moving average values is directly proportional to the number of frames per second at which the camera captures images.

4. The method of claim 2 wherein the camera is mounted to an unmanned aircraft in a forward looking position and the X-by-Y frames with fixed pattern noise compensated image values are wirelessly transmitted to an electronic display device used by an operator of the unmanned aircraft so that a view of a runway during a landing approach can be visually observed on the display device.

5. A computer program product, comprising a computer usable nontransitory media having tangible computer readable program code embodied therein, said tangible computer readable program code adapted to be executed to implement a method for implementing fixed pattern noise compensation for captured visual images by a camera of a moving scene, said method comprising:
   storing a current X-by-Y frame of image values captured by the camera in memory where the magnitude of each image value represents a light level associated with a respective X-by-Y position in the frame;
   determining a moving average value for each image value over a number of X-by-Y frames where the moving average value for each X-by-Y image value represents a level of fixed pattern noise for the moving scene, where the number of X-by-Y frames used to determine the moving average values is inversely proportional to the speed at which the camera is moving;
   generating X-by-Y frames with fixed pattern noise compensated image values based on subtracting from each image value of the current X-by-Y frame the corresponding moving average value.

6. The computer program product of claim 5 further comprising tangible computer readable program code adapted to transmit the X-by-Y frames with fixed pattern noise compensated image values to an electronic display device and render visual information on a screen of the display device based on the X-by-Y frames with fixed pattern noise compensated image values so that fixed pattern noise is minimized in the rendered visual information.

7. The computer program product of claim 5 wherein the number of X-by-Y frames used to determine the moving average values is directly proportional to the number of frames per second at which the camera captures images.

8. The computer program product of claim 6 wherein the camera is mounted to an unmanned aircraft in a forward looking position and the X-by-Y frames with fixed pattern noise compensated image values are wirelessly transmitted to an electronic display device used by an operator of the unmanned aircraft so that a view of a runway during a landing approach can be visually observed on the display device.

9. A method for implementing fixed pattern noise compensation for captured visual images by a camera of a moving scene comprising the steps of:

storing a current X-by-Y frame of image values captured by the camera in memory where the magnitude of each image value represents a light level associated with a respective X-by-Y position in the frame;

determining a moving average value for each image value over a number of X-by-Y frames where the moving average value for each X-by-Y image value represents a level of fixed pattern noise for the moving scene, where the number of X-by-Y frames used to determine the moving average values is directly proportional to the number of frames per second at which the camera captures images;

generating X-by-Y frames with fixed pattern noise compensation based on subtracting from each image value of the current X-by-Y frame the corresponding moving average value.

10. The method of claim 9 further comprising transmitting the X-by-Y frames with fixed pattern noise compensated image values to an electronic display device and rendering visual information on a screen of the display device based on the X-by-Y frames with fixed pattern noise compensated image values so that fixed pattern noise is minimized in the rendered visual information.

11. The method of claim 9 wherein the number of X-by-Y frames used to determine the moving average values is inversely proportional to the speed at which the camera is moving.

12. The method of claim 10 wherein the camera is mounted to an unmanned aircraft in a forward looking position and the X-by-Y frames with fixed pattern noise compensated image values are wirelessly transmitted to an electronic display device used by an operator of the unmanned aircraft so that a view of a runway during a landing approach can be visually observed on the display device.

13. A computer program product, comprising a computer usable nontransitory media having tangible computer readable program code embodied therein, said tangible computer readable program code adapted to be executed to implement a method for implementing fixed pattern noise compensation for captured visual images by a camera of a moving scene, said method comprising:

storing a current X-by-Y frame of image values captured by the camera in memory where the magnitude of each image value represents a light level associated with a respective X-by-Y position in the frame;

determining a moving average value for each image value over a number of X-by-Y frames where the moving average value for each X-by-Y image value represents a level of fixed pattern noise for the moving scene, where the number of X-by-Y frames used to determine the moving average values is directly proportional to the number of frames per second at which the camera captures images;

generating X-by-Y frames with fixed pattern noise compensated image values based on subtracting from each image value of the current X-by-Y frame the corresponding moving average value.

14. The computer program product of claim 13 further comprising tangible computer readable program code adapted to transmit the X-by-Y frames with fixed pattern noise compensated image values to an electronic display device and render visual information on a screen of the display device based on the X-by-Y frames with fixed pattern noise compensated image values so that fixed pattern noise is minimized in the rendered visual information.

15. The computer program product of claim 13 wherein the number of X-by-Y frames used to determine the moving average values is inversely proportional to the speed at which the camera is moving.

16. The computer program product of claim 13 wherein the camera is mounted to an unmanned aircraft in a forward looking position and the X-by-Y frames with fixed pattern noise compensated image values are wirelessly transmitted to an electronic display device used by an operator of the unmanned aircraft so that a view of a runway during a landing approach can be visually observed on the display device.

* * * * *